Aug. 29, 1950     T. VEIT     2,520,378
INTERNAL-COMBUSTION ENGINE
Filed Oct. 11, 1943
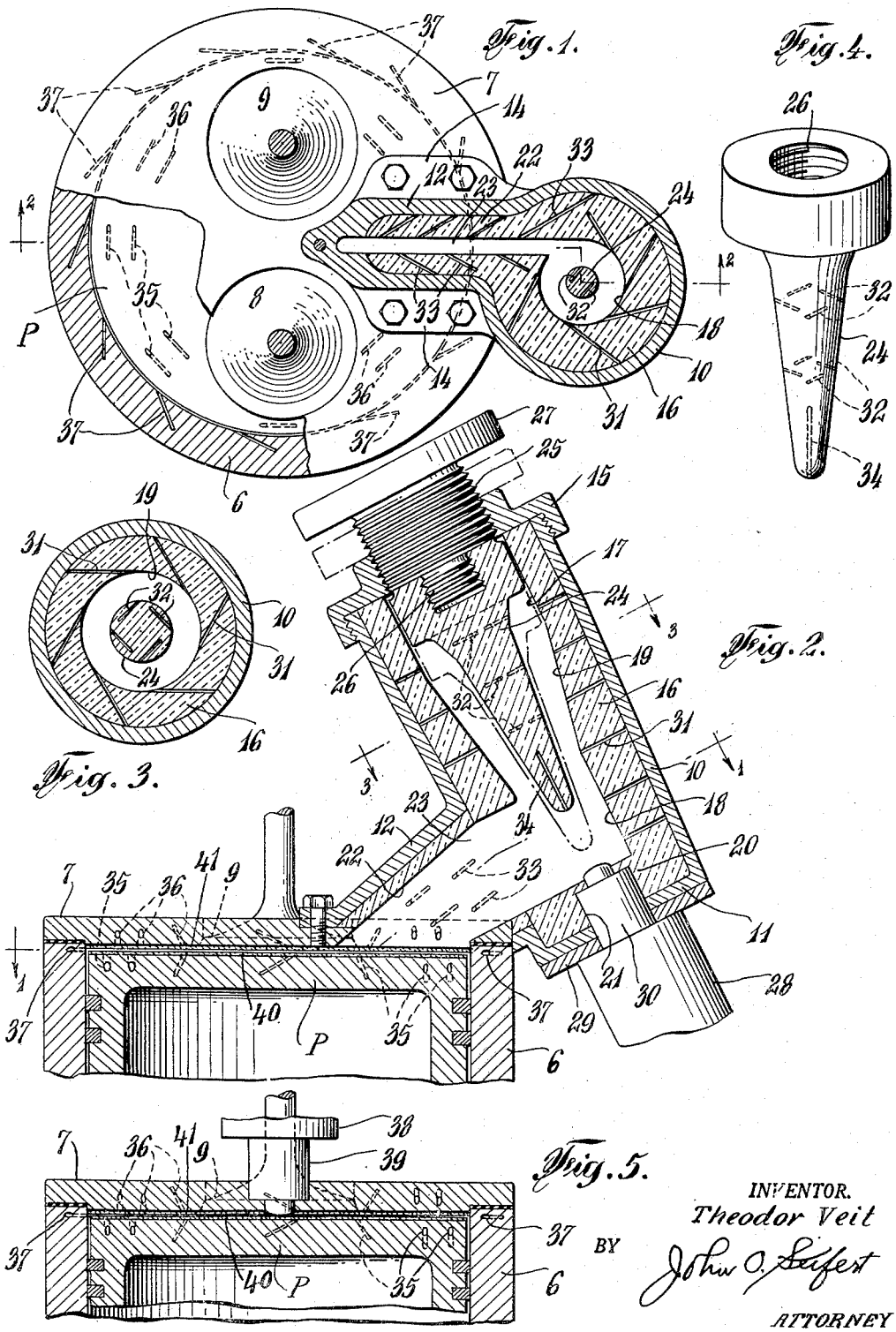
INVENTOR.
Theodor Veit
BY John O. Seifert
ATTORNEY Patented Aug. 29, 1950

2,520,378

UNITED STATES PATENT OFFICE 2,520,378

INTERNAL-COMBUSTION ENGINE

Theodor Veit, New York, N. Y.

Application October 11, 1943, Serial No. 505,721

11 Claims. (Cl. 123—32)

This invention relates to internal combustion engines, and while the invention is adapted for use in internal combustion engines of different types the invention relates particularly to internal combustion engines of the liquid fuel injection compression ignition type.

It is an object of the invention to provide in internal combustion engines of this type and improved constructed and arranged auxiliary turbulence creating combustion chamber comprising an elongated body member having a chamber therein arranged with an annular space extending for the major portion of the length of the chamber from adjacent one end toward and merging at the opposite end with a cylindrical space having an opening adapted to be connected to the engine cylinder restricted transversely of the width thereof and the width being substantially equal to the length of the cylindrical space and opening tangentially to said space of the combustion chamber and causing swirling action and spiral travel of the air delivered therethrough into the combustion chamber, and a liquid fuel injection nozzle opening to the end of the cylindrical space of the combustion chamber arranged to inject liquid fuel longitudinally into the combustion chamber across the whirling and spirally travelling air causing intimate mixing of the fuel-air charge and assuring reduction in ignition lag and promoting combustion of the fuel-air charge as well as causing uniform distribution of the ignited fuel-air charge emanating from the combustion chamber.

It is another object of the invention to provide an improved construction and arrangement of auxiliary turbulence creating combustion chamber for engines of this type comprising a body member having a bore therein arranged with portions of different diameters at the opposite ends and the surface of the bore between said end portions tapering from the bore portion of larger diameter at one end to the bore portion of smaller diameter at the opposite end, and a tapering core member mounted at the base in and closing the bore portion of larger diameter and extending for the major portion of the bore with the tapering surface thereof extending parallel to and spaced from the tapering surface of the body bore to form an annular space therebetween merging with the bore portion of smaller diameter, and a passage restricted transversely of the width and of a width substantially equal to the length of and opening tangentially to the bore portion of smaller diameter, and a fuel injection nozzle opening through the end of the bore portion of smaller diameter arranged to inject fuel streams longitudinally into the auxiliary combustion chamber across the swirling and spirally travelling air charge.

It is a further object of the invention to provide in an auxiliary combustion chamber in engines of this type elongated and transversely restricted recesses in and opening tangentially through the surface of the wall of the bore of the body member and the core member as well as in the wall of the passage for the entrance and compression therein of air of the air charge to cushion the combustion pressure and thus prevent knocking and more smooth operation of the engine, and the air adapted to be relieved from said recesses to serve as an aid to the combustion of the fuel-air charge and facilitate transfer of the ignited fuel-air charge from the auxiliary combustion chamber to the combustion space of the engine cylinder and scavenge the auxiliary combustion chamber.

It is another object of the invention to provide in an auxiliary turbulence creating combustion chamber of this type a tubular shell or casing arranged with a laterally extending projection having a liner therein and in which casing the body member of the auxiliary combustion chamber is mounted, and a carrier for the tapering core member adjustably mounted in the end of the casing disposed relative to the end of the body member having the bore portion of larger diameter adapted to adjust the core member into and out from the bore of the body member to vary the volumetric capacity of the combustion chamber, and said body and core members and liner comprising a material adapted to retain the heat of combustion to heat the air charge and thereby effect a reduction in the ignition lag of the fuel-air charge and speed up combustion of the fuel-air charge and adapt internal combustion engines of this type to be operated at lower compression pressures.

It is a further object of the invention to provide an auxiliary turbulence creating combustion chamber of this character wherein the body and core as well as the liner for the shell or casing projection comprises a heat retaining material having a layer of a combustion promoting catalyst applied thereto, or are constructed of a catalyst material, to reduce ignition lag of the fuel-air charge by catalytic action and effect ignition of the fuel-air charge at a lower compression pressure and temperature making it possible to operate engines of this type at lower compression and combustion pressures and provide a more smoothly and efficiently operating engine and permit of a lighter engine structure.

Other objects and advantages of the invention will hereinafter appear.

In the drawing accompanying and forming a part of this application only so much of the cylinder and a piston reciprocatory therein is shown as is essential to an understanding of the invention, and wherein Figure 1 is a top plan view showing the turbulence combustion chamber in section, the section being taken on the line 1—1 of Figure 2, to show the arrangement of the pockets in the walls of the combustion chamber and passageway connecting the combustion chamber to the engine cylinder, and the cylinder head being partly broken away and the cylinder wall partly in section to show the arrangement of pockets in the face of the piston and in the portion of the cylinder wall bounding the compression space of the cylinder.

Figure 2 is a sectional view taken on the line 2—2 of Figure 1.

Figure 3 is a cross sectional view taken on the line 3—3 of Figure 2.

Figure 4 is a perspective view of a core adjustably mounted in an end of and extended in the combustion chamber and in conjunction with the side wall of the combustion chamber forming the major portion of the combustion chamber to annular form; and Figure 5 is a cross sectional view of a portion of a piston and cylinder of an internal combustion engine wherein fuel is injected directly into the compression and combustion space in the cylinder, and showing an embodiment of a feature of the invention in connection therewith.

The embodiment of the invention illustrated in Figures 1 to 4, inclusive, comprises a cylinder 6 having a head 7 removably connected to the end thereof and a piston P reciprocating in the cylinder, the cylinder head having an air inlet opening and an exhaust outlet opening controlled by valves, as is usual in four cycle internal combustion engines of this type, as shown at 8 and 9, respectively, although it is to be understood that the invention is not limited to use in four cycle engines, but may also be used in connection with two cycle internal combustion engines. The engine cylinder is arranged relative to the connection of the piston with the crank shaft so that the movement of the piston into the cylinder is such as to define with the cylinder in the top dead center position of the piston a constricted compression space between the faces of the piston and head of the cylinder.

An auxiliary turbulence creating combustion chamber is disposed exterior of the engine cylinder, and as shown comprises a tubular casing or shell 10 the bore of which is provided with a portion of uniform diameter at one end and the wall converging or tapering from said wall portion to the opposite end at a slight angle to the axis of the shell and said latter end of the shell flanged inwardly, as at 11, providing said end of the shell with a restricted axial opening. The shell has a tubular portion 12 projecting laterally therefrom adjacent the flanged end, the end of which projecting portion is arranged to extend at an acute angle to the axis of the shell and having flanges extending laterally from the opposite sides thereof whereby the shell is secured to the cylinder head by screws extended through openings in said flanges and threaded into openings in the cylinder head, as shown at 14 in Figure 1, with the opening in the tubular portion in communication with the cylinder through an opening in the cylinder head. The passageway in the tubular portion 12 is of ribbon-like form; that is, it is constricted transversely of the width thereof, and preferably of a ratio of width relative to the thickness of not less than 4 to 1, and the width of the passage at the end in communication with the shell extending parallel to the axis of the shell. The opening in the cylinder head corresponds in cross section form to the passage in the projecting portion 12 and extends radially of the cylinder in a plane between the inlet and outlet openings. By this arrangement of the projecting portion 12 and connection thereof to the cylinder head the outlet of the passage extends at an acute angle to the cylinder head for a purpose hereinafter described. A cap 15 is screw threaded onto the end of the shell 10 of uniform diameter.

The turbulence combustion chamber may comprise a metallic material, such as compressed powdered metal, or a refractory material, such as porcelain or magnesium oxide, or either of said materials and having on the inner surface a layer of a catalyst material, such as copper, iron, vanadium and other materials, or it may consist of a catalyst material, and in the case of compressed powdered metal and refractory material having a catalyst material combined therewith and sintered or fused together. As shown the combustion chamber proper comprises a tubular body 16 the outer contour of which conforms to the shape of the shell 10 and the bore is arranged with cylindrical portions 17, 18 of uniform and different diameters, the portion 17 being of larger diameter and opening through the end of the body of uniform diameter and the portion 18 being disposed adjacent the opposite end of the body. The intermediate wall portion of the bore converges or tapers from the portion 17 of larger diameter to the portion 18 of smaller diameter, as at 19, forming said portion of the bore substantially of truncated conical form. The body bore is provided with an annular flange or shoulder 20 at the end of the cylindrical portion 18, providing a restricted bore portion between said cylindrical portion 18 and a portion 21 of the bore opening through the end of the body of the same diameter as and in register with the opening in the shell flange 11. A liner 22 of heat retaining material, and consisting preferably of the same material as the body 16, is arranged in the shell projection 12, the passageway in the liner being of the same cross sectional shape as the passageway in the projection with one end of the passageway in communication with the opening in the cylinder head, and the opening in the cylinder head being of the same cross sectional area as the passageway in the liner so that the liner is supported on the marginal portions of the cylinder head about the opening therein. The opposite end of said passageway is in register with an opening 23 conforming in shape thereto in the tubular member 16, constituting a continuation of the passageway in the liner 22 and entering tangentially into the cylindrical portion 18 of the body bore and forming said cylindrical portion in effect to a figure of revolution, as shown in Figure 1.

To arrange the bore of the body 12 as a closed chamber and constitute the turbulence combustion chamber proper, a core 24 of heat retaining material, and consisting preferably of the same material as the body 16, is mounted in the cap 15 to extend into the body bore. As shown, the core has a base portion of a diameter to have a sliding fit in the portion 17 of the body bore and a portion projecting therefrom of greater length than and extending through the portion with the tapering wall 19 and extending into the cylindrical portion 18 of the body bore, the projecting portion tapering toward the end at substantially the same angle as and being of less cross sectional dimensions than said converging or tapering wall portion of the body bore and arranging the major portion of the combustion chamber substantially to annular tapering or truncated conical form merging at the end of smaller diameter with the cylindrical portion 18. The core is mounted on and carried by an externally threaded plug 25 having screw thread connection with an axial opening in the cap 15 and the core connected thereto by an externally screw threaded portion of reduced diameter extending axially from the plug having screw threaded connection with a socket in the base of the core, as shown at 26 in Figure 2. The base portion of the core is of less length than the wall portion of uniform diameter 17 of the body bore, whereby the base of the core is adapted to have adjustment relative to said portion of the bore by screwing the plug 25 into and out of the cap opening to adjust the core inwardly and outwardly of the turbulence combustion chamber and vary the volumetric capacity of said chamber for a purpose hereinafter described. The plug 25 is provided with a hand wheel 27 at the outer end to facilitate manipulating the plug to adjust the core carried thereby.

The end of the body bore opening to the cylindrical portion 18 is closed to arrange the bore as an entirely closed chamber in communication with the passageway in the liner 22 by a fuel injection nozzle, shown in a conventional manner at 28, mounted on the flanged end 11 of the shell 10 with an interposed gasket 29. A reduced portion 30 of the nozzle is extended through the opening in the flange of the shell into the portion 21 of the bore and communicates through the restricted portion 20 with the cylindrical portion 18 of the combustion chamber. The nozzle is of the multiple orifice type, in the present instance having four circularly spaced orifices arranged to inject sprays of liquid fuel through the cylindrical portion 18 into the annular portion of the combustion chamber without impinging the fuel against the walls of the combustion chamber.

In the operation of an engine as described, during the initial suction stroke of the piston in the cylinder air, and during the operation of the engine spent gases of combustion, are withdrawn from the turbulence combustion chamber creating a vacuum therein. Air is drawn into the engine cylinder during the entire suction stroke of the piston and air continues to enter into the engine cylinder as the piston commenced its compression stroke displacing the vacuum in the turbulence combustion chamber and filling said chamber and the combustion space of the engine cylinder. During the compression stroke of the piston air is transferred from the engine cylinder through the passageway 22 tangentially into the cylindrical portion 18 and compressed in the combustion chamber, and due to the cross sectional form of the passageway 22 a broad and flat ribbon-like stream of air is caused to enter tangentially into and travel in a circular path at a very high velocity in the cylindrical portion 18 of the turbulence combustion chamber and caused to travel in a spiral about the core to the end of the annular portion of larger diameter of the combustion chamber obviating any dead air pockets therein. As the piston approaches its top dead center position liquid fuel sprays are injected by the nozzle 28 longitudinally into the turbulence combustion chamber across the swirling air in the cylindrical portion thereof and relative to the spirally travelling air in the annular portion of the combustion chamber, the swirling action of the air dispersing any fuel mist congregating about the nozzle and thoroughly commingling the fuel with the air and forming an intimately mixed fuel-air charge which is adapted to be quickly ignited with the least possible lag by the heat of the compressed air and effect rapid flame propagation and combustion of the fuel-air charge which passes from the combustion chamber through the passageway 22 into the combustion space in the cylinder carrying with it some of the liquid fuel. By the arrangement of the passageway and connection thereof with the cylinder through the cylinder head the ignited fuel-air charge emanating from the passage 22 is caused to sweep across and is uniformly distributed in the combustion space of the cylinder assuring thorough commingling thereof with the air and producing quick flame propagation and combustion of the combustibles in the combustion space of the engine cylinder. While the material of the tubular body 16, the core 24 and liner 22 comprises a material having the property of retaining heat therein it also is of low thermal conductivity with the result that such material, and particularly the tubular body, will also isolate the heat in the combustion chamber and retard the transmission of the heat to the shell 10 and radiation thereof from the exterior of the chamber. During the operation of the engine the inner surface of the body, core and liner exposed to the heat of combustion in the combustion chamber and said surfaces as well as a substantial portion of the material inwardly from said surfaces are heated to a high temperature and the heat retained therein is radiated from said surfaces and transferred to the air entered into and compressed in the turbulence combustion chamber as well as the fuel-air charge, not only heating said air charge and the fuel-air charge inwardly from the outer side but also from the interior thereof by the heat radiated from the core 24 and facilitating the heating of the air in the turbulence combustion chamber to an igniting temperature and effecting igniting of the fuel-air charge at a lower compression pressure reducing ignition lag and inducing quick flame propagation and speeding up combustion of the fuel-air charge making is possible to operate engines of this type at a lower compression pressure. By providing the surfaces of the body 16, core 24 and liner 22 exposed to the turbulence combustion chamber with a layer of catalyst material, or constructing said parts wholly of a catalyst material, which material may have the property of retaining heat, will further reduce ignition lag of the fuel-air charge, the catalyst material by catalytic action promoting ignition of the fuel-air charge at a lower compression pressure and accelerating the combustion process. The swirling action of the air in the turbulence combustion chamber effects intimate mixing of the liquid fuel sprays injected into the combustion chamber with the air charge, and the heating of the air charge by the heat radiated from the walls of the combustion chamber results in a reduction in the ignition lag especially so when the body, core and liner are provided with a layer of catalyst material, or are constructed wholly of a catalyst material, making it possible to operate engines of this type at a lower compression pressure, and providing an engine developing more power from a given piston displacement and a high speed operating engine having high fuel efficiency, as well as producing an engine that is less sensitive to changes in speed and load, or to variations in the grade and quality of the fuel used, resulting in better idling and a smoother operating engine with a consequent reduction in wearing of the parts. Furthermore, by arranging the turbulence combustion chamber with the annular conical portion the combustion chamber is provided with a large heat radiating surface and is adapted to function to break the intensity of the explosion waves.

In the normal operation of the engine the core 24 is adjusted substantially to the position shown in full lines in Figure 2. In starting the engine the core 24 is adjusted into the body 16 to the dotted line position shown and maintained in said position during the starting period, the inward adjustment of the core reducing the volumetric capacity of the turbulence combustion chamber and causing an increase in the compression pressure of the air charge in the combustion chamber and thus an increase in the temperature assuring ignition of the fuel-air charge. After the engine has warmed up the core is again adjusted outwardly to its normal position shown in full lines. The adjustment of the core, and thereby varying the volumetric capacity of the combustion chamber, also adapts the engine for use with various kinds and grades of fuel.

The body 16, the tapering portion of the core 24 and the liner 22 are provided with pockets 31, 32 and 33, respectively, adapted for the entrance and compression of air of the air charge therein, the core having also a pocket 34 axially in the free end thereof. These pockets are preferably in the form of elongated recesses of relatively small cross sectional dimension. The pockets 31 in the body 16 are spaced about and longitudinally of the body and open through and extend in a plane tangential to the inner surface of the body. The pockets 32 in the core are also spaced about and longitudinally of the core and open through and extend in a plane tangential to the outer surface thereof. The pockets 31 and 32 in the body and core incline in the direction of flow of the swirling and spirally travelling air in the combustion chamber for a purpose hereinafter described. The pockets 33 in the liner 22 are spaced longitudinally of the opposite side walls of the passageway therein and incline in a direction toward the connection of the passageway with the cylinder, the pockets in one side of the liner 22 opening to the passageway in staggered relation to the pockets in the opposite side wall, as shown in Figure 1. Similar pockets for the entrance and compression of air of the air charge are also arranged in the faces of the piston and cylinder head and in that portion of the cylinder wall bounding the compression space between the faces of the piston and cylinder head, as shown at 35, 36 and 37, respectively. As shown, the pockets in the face of the piston are disposed in spaced circular rows and incline from the opening thereof at the same angle and in the same direction, as shown in Figure 1, and the pockets in the face of the cylinder head are disposed in spaced arcuate rows in the portions of the cylinder head between the air inlet and exhaust outlet and incline from the inlet at the same angle and in the same direction and in a direction opposite to the inclination of the pockets in the face of the piston so that the pockets in the piston and cylinder head converge toward each other, as shown in Figure 1. The pockets 37 in the cylinder wall open through and extend in planes tangential to the cylinder as shown in Figure 1. The faces of the piston and cylinder head are also provided with a layer of heat retaining material and/or a catalyst material.

In internal combustion engines of the liquid fuel injection compression ignition type, when the fuel-air charge is ignited and combustion takes place there is a sudden rise in the pressure in the combustion chamber and compression space of the cylinder the force of which is exerted on and resisted by the piston due to its connection to the crank shaft with a consequent knocking of the engine and quick wearing of the parts. By the provision of the pockets in the turbulence combustion chamber and in the passageway connecting the combustion chamber to the cylinder, and in the faces of the piston and cylinder head and cylinder, the shock of the sudden increase in pressure by the combustion pressure is absorbed and cushioned by the air in the pockets relieving the piston and its crank shaft connection of such excessive pressure preventing knocking and less wearing of the engine parts. As the piston commences its power stroke with a consequent reduction in the pressure in the combustion space in the cylinder and turbulence combustion chamber the air is relieved from the pockets and aids and partakes in the combustion of the combustibles of the fuel-air charge. By arranging the pockets in the walls of the combustion chamber and core to open through and to extend in a plane tangential to the wall thereof the air emanating from the pockets tends to continue the swirling action of the burning fuel-air charge promoting combustion and speeding up the combustion process. The last air emanating from the pockets in the combustion chamber acts to scavenge and drive out all of the combustible and spent gases from the turbulence combustion chamber into the cylinder from which they are exhausted through the exhaust outlet and thus obviate the possibility of premature ignition of a successive fuel-air charge in the combustion chamber. The pocket 34 in the end of the core is opposed to the fuel injection nozzle 30 and the air emanating from said pocket is directed against the nozzle and clears it of any fuel oil droplings. By the sudden passage of the ignited fuel-air charge from the turbulence combustion chamber into the cylinder part of the fine fuel spray will be entrained therewith into the cylinder and as the air charge in the cylinder at such time is under its highest compression pressure and temperature it will assure rapid combustion of the combustibles of the air in the engine cylinder. Should combustibles of the fuel-air charge enter into the air pockets in the combustion chamber and be prematurely ignited, or be ignited simultaneously with the igniting of the fuel-air charge and a consequent blowing off of the air from said pockets, this will only facilitate combustion and reduce ignition lag of the fuel-air charge. By arranging the pockets within the combustion chamber there will be no loss in thermal efficiency and reaction, and by making the combustion chamber proper of a heat retaining material, particularly of a catalyst, the heat retained thereby will be radiated from the walls of the combustion chamber and will heat the air transferred into and compressed in the combustion chamber, assuring quick ignition and making it possible to ignite the fuel-air charge at a lower compression pressure and to operate engines of this type at lower compression and combustion pressures and permits making the engine of lighter structure.

The air in the compression space of the cylinder will aid and partake in the combustion of the combustibles of the ignited fuel-air charge emanating from the combustion chamber into said compression space of the cylinder, and as the power stroke is imparted to the piston by the expansion forces of the combustion pressure with a consequent lowering of such pressure the air is relieved from the pockets in the piston and cylinder and will aid and partake in the combustion of the combustibles of the ignited fuel-air charge. By arranging the pockets in the faces of the piston and cylinder head to converge toward each other, and the pockets in the portion of the cylinder opening to the compression space to open tangentially of the wall of the cylinder will set up a swirling action of the air emanating from said pockets assuring an intimate and quick mixing of said air with the combustibles of the ignited fuel-air charge and a consequent speeding up of the completion of the combustion process.

By the construction and arrangement of the carrying casing or shell for the body and core of the turbulence combustion chamber and the nozzle, whether the shell is constructed integral with or separately from and removably connected to the cylinder, such parts of the combustion chamber and the nozzle by unscrewing the cap 15 may be readily dissembled for inspection, cleaning or substitution of parts without removing the combustion chamber from the cylinder or any pipe connections or other parts of the engine.

In Figure 5 there is shown a portion of a cylinder and piston of an engine having pockets or recesses in the faces of the cylinder head and piston, as well as in the portion of the cylinder wall bounding the compression space in the cylinder for the entrance and compression therein of air of the air charge the same as in Figures 1 and 2 and like parts have been given the same reference characters, but is adapted as a direct fuel injection internal combustion engine of this type, the fuel being injected directly into the compression space between the faces of the piston and cylinder head by a nozzle 38 mounted in a bore in the cylinder head, and the end of the nozzle may be of reduced diameter and engaged in a portion of reduced diameter of the bore, as shown at 39. The engine may be of the four cycle type as shown having the valve controlled air inlet and valve controlled exhaust outlet, or may be of the two cycle type. The pockets 35 and 36 in the faces of the piston and cylinder head, and the pockets 37 in the cylinder wall opening to the compression space between the piston and cylinder head, are arranged as described. Also the faces of the piston and cylinder head in the Figure 5 arrangement as well as in the Figure 2 arrangement may be provided with a layer of heat retaining material, or is provided with a layer of such material and a layer of a catalyst material, or said layer may consist wholly of a catalyst material so shown in a conventional manner at 40 and 41. As the fuel is injected into the compression space in the cylinder and the fuel-air charge is ignited the shock of the combustion pressure is absorbed and cushioned by the air in the pockets, thus relieving the piston of said forces of the combustion pressure preventing knocking and causing the engine to operate more smoothly. As the piston commences its power stroke with a consequent reduction of pressure in the combustion space of the cylinder the air is relieved from the pockets and will aid and partake in the combustion of the fuel-air charge. By arranging the pockets 35, 36 in the faces of the piston and cylinder head to converge toward each other and the pockets 37 in the cylinder wall to open tangentially to the compression space the air emanating from the pockets will set up a swirling action of the ignited fuel-air charge in the cylinder assuring quick and intimate mixing of such air therewith and speeding up the completion of the combustion process.

Various modifications may be made in the construction and arrangement of parts without departing from the invention, and portions of the invention may be used without others and come within the scope of the invention.

Having described my invention, I claim:

1. In an internal combustion engine of the liquid fuel injection compression ignition type including a cylinder and a piston reciprocating therein, an auxiliary turbulence creating combustion chamber comprising a body member connected to the head of the engine cylinder having a chamber therein arranged with an annular space extending from adjacent one end of the chamber for the major portion of the length of the chamber toward and merging with a cylindrical space at the opposite end of the chamber, a passage opening at one end tangentially into and of a width substantially equal to the length of the cylindrical space of the chamber and at the opposite end opening through the head of the engine cylinder adapted for the transfer of air from the engine cylinder into and cause swirling action of the air in the auxiliary combustion chamber, and a fuel injection nozzle opening through the end of the cylindrical space at the one end of the auxiliary combustion chamber arranged to deliver sprays of fuel longitudinally into the auxiliary combustion chamber across the path of the swirling air therein.

2. In internal combustion engines of the liquid fuel injection compression ignition type including a cylinder and a piston reciprocating therein, an auxiliary turbulence creating combustion chamber having a chamber therein arranged with an annular truncated conical space with the end of larger diameter of said space at one end of and extending for the major portion of the length of the chamber and the opposite end of said annular space merging in a cylindrical portion at the opposite end of the chamber and said chamber having an inlet opening tangentially into the cylindrical portion of the combustion chamber and adapted to be connected in communication with the engine cylinder to transfer air therethrough from the engine cylinder and deliver the air into and cause swirling action and spiral travel of the air in the auxiliary combustion chamber, and a liquid fuel injection nozzle opening to the end of the cylindrical space in the auxiliary combustion chamber arranged to discharge sprays of fuel into the auxiliary combustion chamber across the swirling air therein.

3. In internal combustion engines of the liquid fuel injection compression ignition type including a cylinder and a piston reciprocating therein, an auxiliary turbulence creating combustion chamber comprising a tubular body member, a core member mounted at one end in and closing one end of the body bore and extending centrally into the body bore for the major portion of the length thereof, said core member being of less cross sectional dimension than the body bore and the surface thereof spaced from the wall of the body bore forming an annular space therebetween merging with a cylindrical space at the opposite end of the body bore, a passageway restricted transversely of the width thereof and of a width substantially equal to the length of and opening tangentially into the cylindrical space at the one end of the combustion chamber and the opposite end of the passageway in communication with the engine cylinder for the transfer therethrough of air from the engine cylinder into and cause swirling action of the air in the auxiliary combustion chamber, a fuel nozzle mounted in and closing the end of the cylindrical space in the combustion chamber arranged to discharge fuel sprays longitudinally into the auxiliary combustion chamber across the swirling air therein.

4. In internal combustion engines of the liquid fuel injection compression ignition type including a cylinder and a piston reciprocating in the cylinder, an auxiliary turbulence creating combustion chamber comprising a body member having a bore therethrough arranged with portions of different diameters at the opposite ends and the intermediate wall portion tapering from the portion of larger diameter to the portion of the bore of smaller diameter, a tapering core member having a base portion of a diameter substantially equal to the diameter of and engaged in the bore portion of larger diameter and extending into the body bore for the major portion of the length thereof with the tapering surface spaced from the tapering wall portion of the body bore forming an annular truncated conical space therebetween, means supporting and adjustably mounting the core member in and closing the end of the body bore of larger diameter and operative to adjust the core member into and out of the body bore to vary the area of the auxiliary combustion chamber, a passageway for the transfer of air therethrough from the engine cylinder into the auxiliary combustion chamber, said passageway being restricted transversely of the width thereof and of a width substantially equal to the length of and opening tangentially into the end portion of the body bore of smaller diameter and cause swirling action of the air delivered into the auxiliary combustion chamber, and a fuel injecting nozzle mounted in and closing the end portion of the body bore of smaller diameter arranged to discharge fuel streams longitudinally into the combustion chamber across the swirling air without impinging the fuel against the walls of the auxiliary combustion chamber.

5. An auxiliary combustion chamber for internal combustion engines of the fuel injection compression ignition type as claimed in claim 4, wherein there is arranged in the wall of the body bore and core member elongated recesses of relatively small cross sectional dimension extending in planes tangentially to the surface of the body bore and core member for the entrance and compression of air of the air charge therein, and said air adapted to be relieved from said recesses by a reduction of pressure in the combustion chamber.

6. In internal combustion engines of the fuel injection compression ignition type including a cylinder and a piston reciprocating therein, an auxiliary turbulence creating combustion chamber, comprising a tubular casing having an inwardly extending flange at one end and a laterally extending tubular projection adjacent the flanged end adapted for connection in communication with the engine cylinder, a tubular body member in the casing the bore of which body is provided with a wall portion tapering from one end toward and merging at the smaller end with a cylindrical portion opening through the flanged end of the casing, a liner in the casing projection forming a passageway opening tangentially to the cylindrical portion at the end of smaller diameter of the tapering wall portion of the body bore, a core member engaged in the end of the body bore at the end of larger diameter of the tapering wall portion extending centrally of the body bore for the major portion of the length thereof and tapering substantially at the same angle as and spaced from the tapering wall portion of the body bore and forming an annular truncated conical space therebetween, said body and core members and the projection liner comprising a heat retaining material, a perforate closure cap removably connected to the casing at the end of the tapering wall portion of larger diameter, means adjustably mounted in the closure cap opening carrying and adapted to adjust the core member to different positions into the body bore to vary the area of the auxiliary combustion chamber, and a fuel injection nozzle mounted in the flanged end of the casing and opening to the cylindrical portion of the body bore at the end of smaller diameter of the tapering wall portion of the body bore arranged to inject fuel streams longitudinally into the auxiliary combustion chamber across the air delivered therein.

7. An auxiliary combustion chamber in internal combustion engines as claimed in claim 6, wherein pockets are arranged in and open through the surface of the wall of the body bore, core member and liner in the casing projection for the entrance and compression therein of air of the air charge and adapted to be relieved therefrom by a reduction in the pressure in the combustion chamber and partake in and aid combustion of the fuel-air charge.

8. In internal combustion engines of the liquid fuel injection and compression ignition type including a cylinder and a piston reciprocating therein, an auxiliary turbulence creating combustion chamber exterior of the engine cylinder comprising an elongated body member having a chamber therein arranged with an annular truncated conical space extending from one end of the chamber for the major portion of the length thereof and merging at the end of smaller diameter with a cylindrical portion extending for the remainder of the chamber, said member having a passageway restricted transversely of the width thereof and of a width equal to the length of the cylindrical space of the chamber and opening tangentially therein, said passageway being adapted for connection with the engine cylinder for the transfer of air from the engine cylinder in a ribbon-like stream into and causing swirling action of the air in the auxiliary combustion chamber, and a nozzle opening through the body member into the cylindrical space of the chamber arranged to discharge fuel streams longitudinally into the chamber in the body member across the swirling air therein, said combustion chamber having recesses of relatively small cross section in and opening through the walls thereof for the entrance and compression of air of the air charge therein adapted to be released from said recesses by a reduction of pressure in the combustion chamber and serve as an aid to the combustion of the fuel-air charge and effect swirling action of the ignited fuel-air charge and scavenge the combustion chamber.

9. In internal combustion engines of the liquid fuel injection compression ignition type including a cylinder and a piston reciprocating therein, an auxiliary turbulence creating combustion chamber comprising a tubular body member having a tapering wall portion intermediate the ends thereof, a tapering core member adjustably mounted at the base in and closing the end of the body bore at the end of larger diameter of the tapering wall portion and extending into the body bore for the major portion of the length thereof, the surface of said core member inclining substantially at the same angle as and spaced from the tapering wall portion of the body bore and forming an annular truncated conical space therebetween, and said body member having a passageway restricted transversely of the width and of a width equal to the length of and opening tangentially into the portion of the body bore at the end of smaller diameter of the tapering wall portion adapted for the delivery of a stream of air in ribbon-like form into and cause swirling and spiral travel of the air in the combustion chamber, and a fuel injection nozzle mounted in and closing the end of the body bore opposite the end in which the core member is mounted and arranged to discharge fuel streams longitudinally into the combustion chamber across the swirling air therein.

10. An auxiliary turbulence creating combustion chamber for internal combustion engines as claimed in claim 9, wherein the body and core members are provided with a layer of a catalyst material on the surface thereof exposed to the combustion chamber.

11. An auxiliary turbulence creating combustion chamber for internal combustion engines as claimed in claim 9, wherein the body and core members consist of a heat retaining material having catalytic properties.

THEODOR VEIT.

REFERENCES CITED

The following references are of record in the file of this patent:

UNITED STATES PATENTS

| Number | Name | Date |
|---|---|---|
| 841,830 | Wackenhuth | Jan. 22, 1907 |
| 861,726 | Howell et al. | July 30, 1907 |
| 1,301,675 | Fessenden | Apr. 22, 1919 |
| 1,320,064 | Junkers | Oct. 28, 1919 |
| 1,605,838 | Hawley, Jr. | Nov. 2, 1926 |
| 1,631,705 | Sokal | June 7, 1927 |
| 1,745,884 | Barnaby | Feb. 4, 1930 |
| 1,754,735 | Barnaby | Apr. 15, 1930 |
| 1,755,578 | Goldsborough | Apr. 22, 1930 |
| 2,012,086 | Mock | Aug. 20, 1935 |
| 2,076,030 | Kahllenberger | Apr. 6, 1937 |
| 2,133,478 | Schlaefke | Oct. 18, 1938 |
| 2,254,438 | McCarthy | Sept. 2, 1941 |
| 2,317,536 | Hocke | Apr. 27, 1943 |

FOREIGN PATENTS

| Number | Country | Date |
|---|---|---|
| 562,673 | Germany | Feb. 19, 1935 |
| 463,362 | Great Britain | Mar. 30, 1937 |